(12) United States Patent
Sturgis et al.

(10) Patent No.: US 7,877,279 B1
(45) Date of Patent: *Jan. 25, 2011

(54) METHOD AND APPARATUS FOR IMPROVING THE LOSS RATIO ON AN INSURANCE PROGRAM BOOK

(75) Inventors: David R. Sturgis, Lafayette, LA (US); David M. Richard, Covington, LA (US); Lawrence R. Sundeen, Abita Springs, LA (US); Vassiliki K. Sabanis, Mandeville, LA (US)

(73) Assignee: F.A. Richard & Associates Inc., Mandeville, LA (US)

( * ) Notice: Subject to any disclaimer, the term of this patent is extended or adjusted under 35 U.S.C. 154(b) by 881 days.

This patent is subject to a terminal disclaimer.

(21) Appl. No.: 11/769,553

(22) Filed: Jun. 27, 2007

Related U.S. Application Data (63) Continuation of application No. 09/775,278, filed on Feb. 1, 2001, now Pat. No. 7,240,016.

(60) Provisional application No. 60/178,972, filed on Feb. 1, 2000.

(51) Int. Cl.
*G06Q 40/00* (2006.01)
*G09B 7/00* (2006.01)

(52) U.S. Cl. .............................. 705/4; 705/38; 434/322

(58) Field of Classification Search ........................ None
See application file for complete search history.

(56) References Cited

U.S. PATENT DOCUMENTS 4,766,539 A    8/1988   Fox 5,523,942 A    6/1996   Tyler et al.
5,809,478 A    9/1998   Greco et al.
5,884,275 A    3/1999   Peterson et al.

(Continued)

FOREIGN PATENT DOCUMENTS

WO    WO 9002388 A1    3/1990

OTHER PUBLICATIONS

Campos, Chris; Graizzaro, Bruno J., Jr. "CPAs and business interruption loss claims." Aug. 1992, CPA Journal, v62, n8, p. 42(5).*

(Continued)

*Primary Examiner*—Robert W Morgan
*Assistant Examiner*—Rachel L Porter
(74) *Attorney, Agent, or Firm*—Garvey, Smith, Nerhbass & North, L.L.C.; Brett A. North (57) ABSTRACT

A method of improving the loss ratio on a book of insurance including the use of a computer data base with a user interface display including questions for insured entities making up the book of insurance. Spaces are provided on the display for the input of answers from an insured. A survey is used to question the insured entity, the survey eliciting answers to the questions posed. Data is input from the answers received into the computer data base at the spaces provided for. The answers that are collected are compared with answers contained in written documents having information that was supplied by a third party insurance underwriter. Inconsistent answers are identified and the information obtained is reported to the underwriter who can determine whether or not the insurance premium of the insured should be adjusted.

8 Claims, 11 Drawing Sheets

U.S. PATENT DOCUMENTS

| | | |
|---|---|---|
| 5,893,072 A | 4/1999 | Zizzamia |
| 5,903,873 A | 5/1999 | Peterson et al. |
| 5,956,691 A | 9/1999 | Powers |
| 5,970,464 A | 10/1999 | Apte et al. |
| 5,974,390 A | 10/1999 | Ross |
| 6,026,364 A | 2/2000 | Whitworth |
| 6,093,026 A | 7/2000 | Walker et al. |
| 6,604,080 B1 | 8/2003 | Kern |
| 7,319,970 B1 * | 1/2008 | Simone ......................... 705/4 |
| 7,430,516 B1 * | 9/2008 | Blair et al. ..................... 705/4 |

OTHER PUBLICATIONS

Shpilberg, David, "A Promising New Frontier," May 1985, Best's Review-Property-Casualty Insurance Edition, v. 86, p. 36 (4).

\* cited by examiner

FIG. 1.

Audit Expert - Select Policy

File  Tools  Help

LAND CO BUILDING & REMODELING, INC.

BILL LANDRY DBA

Insured info
Address:
125 OSAGE WAY
SUMMERVILLE, SC  29483

Contact: BILL LANDRY
Phone: (843)851-8344
Fax:

Agent info
PREFERRED MARKETS INC.
1300 INDIAN WELLS CT
MURRELS INLET, SC 29576

FEIN:  571052069
Phone: (800)550-8054   ext:
Fax: (800)354-3573

Policy info
Policy#  0000214673   A   Est. Premium:

Effective: 9/10/99  to  9/10/00

Close

Ready                                  11/7/00          9:29 AM

Audit Expert Survey - Mary Lemelle

| E. Personnel | F. Occupational Exposures | G. Evaluation | H. Flag Listing |
|---|---|---|---|
| A. Survey Information | B. WC Legal Issues | C. Operations | D. Equipment |

A. Are the following notice(s) prominently posted in a conspicuous place where they would be visible by all employees everday?

1. Employee Notice     ○ Yes   ● No   ○ Unknown

2. Physician's Panel (GA,PA,TN,VA)     ○ Yes   ○ No   ○ Unknown 3. FL only: Has the Insured notified it's employees how to contact Cunningham Lindsey for medical referral?     ○ Yes   ○ No   ○ Unknown B. Who is the person responsible for reporting WC claims and for completing the Employer's First Report of Injury or Occupational Disease?

Name [ Bill ]

Does that person understand that they are to report ALL claims immediately to the Legion Villanova Call Center at (888)892-4381 or by fax to (888)839-0368?     ● Yes   ○ No   ○ Unknown Insured: LAND CO BUILDING & REMODELING, INC.
Contact: BILL LANDRY
Nature of Business: REMODELING
Type of company:

Ready     11/7/00     9:32 AM     Script on

*FIG. 4.*

Audit Expert Survey - Mary Lemelle

| E. Personnel | F. Occupational Exposures | G. Evaluation | H. Flag Listing |
| A. Survey Information | B. WC Legal Issues | C. Operations | D. Equipment |

Total Years in Business: 5

Current Owner: More than 3 Years? ● Yes ○ No

Annual Revenues: $300,000.00

Describe Operations: residential builder. i.e. general contractor.

5022 - MASONRY NOC

Are Subcontractors Used? ● Yes ○ No

| | | |
|---|---|---|
| PLUMBING NOC & Drivers | Y | ● Y ○ N |
| ELECTRICAL WIRING - WITHIN BUILDINGS | Y | ● Y ○ N |
| MASONRY NOC | Y | ● Y ○ N |
| EXCAVATION & Drivers | N | ● Y ○ N |
| CARPENTRY NOC | Y | ● Y ○ N |
| | | ○ Y ○ N |

Insured: LAND CO BUILDING & REMODELING, INC.
Contact: BILL LANDRY
Nature of Business: REMODELING
Type of company:

Ready   11/7/00   9:34 AM   Script on

FIG. 5

Audit Expert Survey - Mary Lemelle

| A. Survey Information | B. WC Legal Issues | C. Operations | D. Equipment |
| F. Occupational Exposures | G. Evaluation | H. Flag Listing |

E. Personnel

Employee's Total: 2  Full Time: 2  Part Time: 0

Temp. agencies used?  ◯ Yes  ● No

Employee Turnover: ● Low  ◯ Med  ◯ High

Casual labor used?  ◯ Yes  ● No

I-9's Received?  ◯ Yes  ● No

Employee Breakdown by State Class Code

| Description | Code | Apv. | #Emp | | | Est. Payroll |
|---|---|---|---|---|---|---|
| ▶ CARPENTRY NOC | 5403 | Y | 1 | | | $18,000.00 |
| ▶ | | | | | | |
| ▶ | | | | | | |
| ▶ | | | | | | |
| ▶ | | | | | | |
| ▶ | | | | | | |
| ▶ | | | | | | |

Insured: LAND CO BUILDING & REMODELING, INC.
Contact: BILL LANDRY
Nature of Business: REMODELING
Type of company:

Ready       11/7/00       9:43 AM       Script on

Audit Expert Survey - Mary Lemelle

E. Personnel
A. Survey Information
F. Occupational Exposures
B. WC Legal Issues
G. Evaluation
C. Operations
H. Flag Listing
D. Equipment Is all equipment consistent with operations?
⦿ Yes    ○ No Insured: LAND CO BUILDING & REMODELING, INC.
Contact: BILL LANDRY
Nature of Business: REMODELING
Type of company:

Ready            11/7/00    9:45 AM    Script on

METHOD AND APPARATUS FOR IMPROVING THE LOSS RATIO ON AN INSURANCE PROGRAM BOOK

CROSS-REFERENCE TO RELATED APPLICATIONS

This is a continuation of U.S. patent application Ser. No. 09/775,278, filed, Feb. 1, 2001, now U.S. Pat. No. 7,240,016 which application claims priority of U.S. Provisional Patent Application No. 60/178,972, filed Feb. 1, 2000. Both of these applications are incorporated herein by reference.

Priority of U.S. Provisional Patent Application No. 60/178, 972, filed Feb. 1, 2000, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a method and apparatus for improving the loss ratio on a book of insurance. More particularly, the present invention relates to a method and apparatus for improving the loss ratio on a book of insurance such as a worker's compensation, general liability, products liability, property, professional liability or the like.

2. General Background of the Invention

Traditionally, entities such as businesses purchase insurance from licensed insurance companies or underwriters through their insurance agent. Insurance agents typically have access to many insurance companies through their markets. The agent and the business seeking insurance typically complete a standardized application for insurance coverage (for example, that form provided by Accord).

The application is typically transmitted via fax or electronically to underwriters who then determine if the risk falls within the underwriters' acceptable underwriting guidelines. If so, they determine a rate for one or more types of coverages, possibly with variable limits, and produce a quote and send it back to the agent. The agent then presents the quotes obtained from the market to his client (the business owner).

When the business owner and the agent decide to accept the quote, the agent binds coverage which in effect tells the underwriter that they accept the quote and would like coverage to begin on a certain date and time. The underwriter then produces a policy and sends it to the agent or business owner who is now the insured. The underwriter also produces an invoice and sends it to the agent or the insured. Usually with the invoice comes loss reporting instructions and other materials to assist the insured with being compliant with applicable laws.

During the policy period each insured enjoys the comfort of knowing that certain losses will be covered by the policy in exchange for conforming with the policy terms (paying the premium and acting in good faith).

With worker's compensation and general liability coverages, the premiums are determined by amount of payroll, by job classification, and by gross revenues. When applying for insurance for one year terms, these figures are typically estimated on the insurance application, and from those estimates, the underwriter's rates are applied and premium determined. After policy expiration, under the policy terms the underwriter has the right to audit the insured's actual payroll, gross sales, and/or proper classification to determine whether additional premium or refund is due.

While certain novel features of the invention shown and described below are pointed out in the annexed claims, the invention is not intended to be limited to the details specified, since a person of ordinary skill in the relevant art will understand that various omissions, modifications, substitutions and changes in the forms and details of the invention illustrated and in its operation may be made without departing in any way from the spirit of the present invention. No feature of the invention is critical or essential unless it is expressly stated as being "critical" or "essential."

BRIEF SUMMARY OF THE INVENTION

On a particular book of insurance the underwriter hopes that the losses reported by its insureds do not exceed the underwriter's expected loss ratio. The method of the present invention provides a method and apparatus for improving the loss ratio for a book of insurance including products liability, property, general liability, professional liability, workmen's compensation and other lines of business insurance.

In a preferred embodiment of the present invention the underwriter can use an audit survey provider to survey insureds in a book of insurance. The underwriter can electronically transmit to the audit service provider policy data captured by the underwriter's system for newly issued and also recently issued policies. The electronically transmitted data can contain relevant information about who the insured was, who the agent was, how the premium was derived, policy terms, along with other policy information.

In many large volume small premium books of insurance it is not practical for the underwriter to have each insured audited to detect improperly characterized risks. If an insurance carrier were to issue a large volume of insurance policies and subsequently utilize the system of the present invention as a means by which to independently verify insurance application information by surveying various insureds and determining the insurability of a risk, the method and apparatus of the present invention could be configured to assign a numeric value or flag to specific questions. Answers provided by insureds increasing the underwriter's exposure to covered losses would be assigned ranking points for that policy or flagged within the system until a final score was calculated or flagged for that insured and policy. Underwriters and other users of the present system would then be able to sort and analyze policies where the audit process has been completed in order to act first upon the policies with the most significant ranking scores or those policies flagged. Hence, after surveying a large volume of insureds, the underwriter need only take action on those which meet its definition of problematic (exceptional ranking scores) or those policies flagged.

The subsequent actions taken by the underwriter to resolve the issues raised by the survey should produce an improved loss ratio by identifying mistakes in characterizing risks. It is assumed that mistakes in defining risks are corrected by policy endorsement and insureds considered poor risks are canceled or not renewed, and over the long term, fewer losses are incurred by the underwriter. It is also assumed that opportunities to collect additional premium for additional exposures discovered by the survey process will be acted upon by the underwriter.

The underwriter may have very specific underwriting guidelines and criteria which include, for example, things like:

Don't insure anyone in the snow plowing business;
Don't insure anyone who uses scaffolding rising above 25 feet;
Don't insure anyone who is in the roofing business (installation or repair);
Don't insure any business that has not been in existence and with stable ownership for more than three years.

Other examples of underwriting criteria can be payroll amounts, revenues, and worker figures not matching those specified in the application.

In one embodiment numerical ranking criteria are derived from various underwriting guidelines and given specific numerical point values (for example, a negative 35 points for businesses not in existence for more than three years) approximating the relative importance of each criteria in relation to all other criteria. A numerical score can be calculated based upon the numerical point values assigned to each ranking criteria and then identifying which specific ranking criteria are applicable to an insured.

The present invention provides a method of using a computer system to survey various insureds asking questions and recording answers about the insured's business activities and history which can validate information sent by the underwriter to the audit survey provider. During the survey the insureds can also be coached on how to comply with basic regulations and loss prevention. During the survey, the audit survey provider records various elements of information that can later be used to identify the applicable ranking criteria and the system calculates a ranking score based on criteria point values assigned to the identified ranking criteria. After receiving the results of the survey, the underwriter can review the ranked insureds and determine whether additional premium is warranted, a policy endorsement is necessary, or even if the insured is deemed a risk violating underwriting guidelines—thus cancellation of the policy would be likely.

With the method of the present invention, policies that should have not have been issued because the risk did not meet applicable underwriting guidelines are readily discovered using the "management by exception." Insureds receiving the most problematic numerical ranking scores or flags can be addressed first by the underwriter and insureds receiving numerical ranking scores considered satisfactory to the underwriter (or receiving no flags) need not be further reviewed.

Another embodiment of the present invention includes the method of obtaining information about an insured risk from an underwriter or the underwriter's designee, independently verifying that information, and simultaneously educating insureds about loss prevention and loss management techniques.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 10:
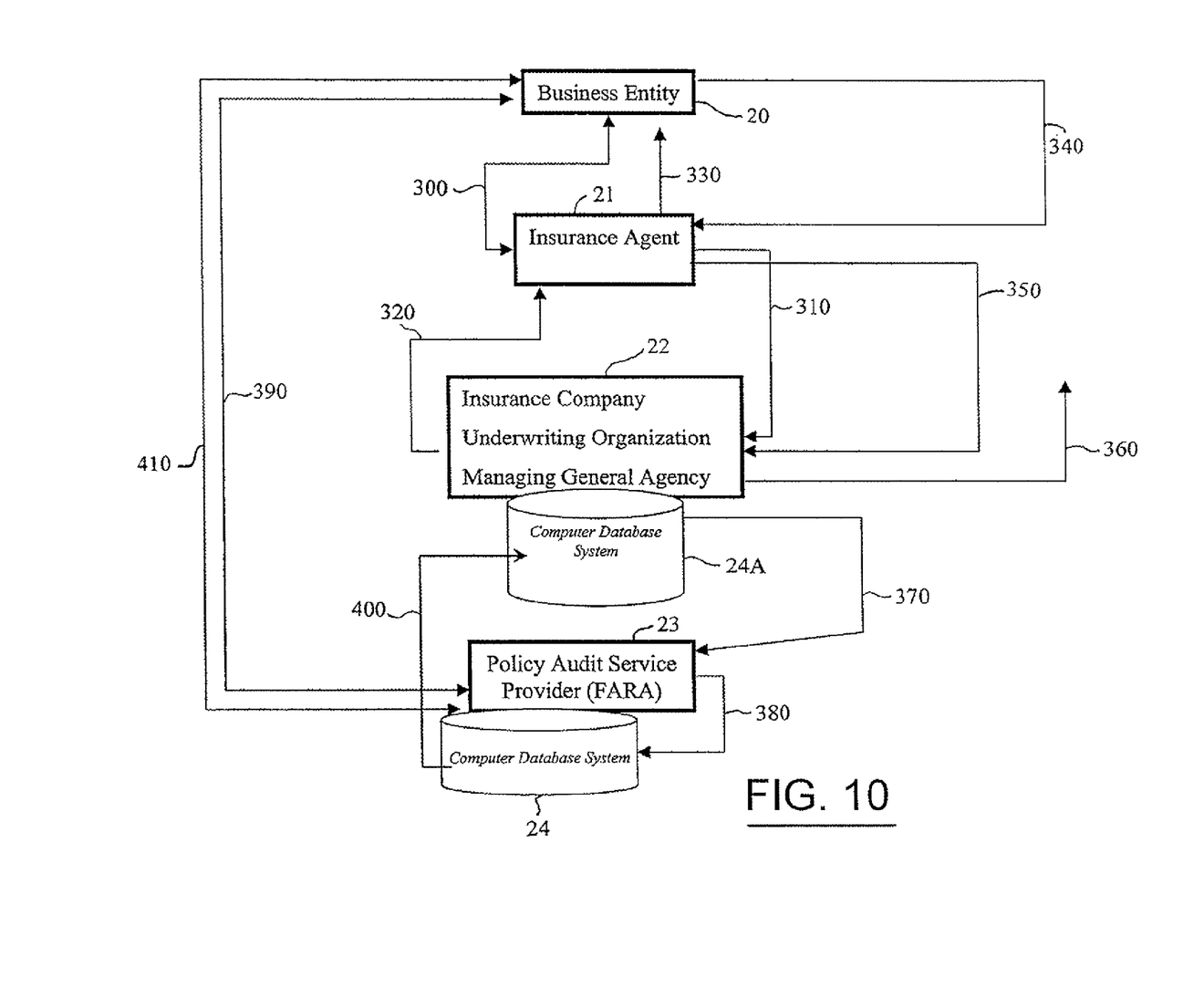
FIG. 10 shows an overall flow diagram illustrating the interaction between the insured, insurance agent, underwriter, and audit survey provider.

The method of the present invention provides an improved method for improving the loss ratio on a book of insurance and can be applied to worker's compensation, general liability, products liability, property, professional liability, and other lines of business insurance. In FIG. 10, an overall flow diagram is provided illustrating the interaction between the insured, insurance agent, underwriter, and audit survey provider in a preferred embodiment of the present invention.

Traditionally, entities such as businesses 20 purchase insurance from underwriters 22 through their insurance agents 21. Insurance agents 21 typically have access many underwriters 22 through their markets. Typically, the agent 21 and the business entity 20 jointly complete an application for insurance coverage 100. The application 100 is typically transmitted to several underwriters 22, for example via fax or electronically, who then determine if the business entity 20 falls within the underwriter's 22 acceptable underwriting guidelines 200. If so, the underwriters 22 determine a rate for one or more types of coverages, possibly with variable limits, and produce a quote and send it back to the agent 21. The agent 21 then presents the various quotes to the business entity 20.

When the business entity 20 decides to accept the quote of a particular underwriter 22, the agent 21 binds coverage which in effect tells the underwriter 22 that the quote has been accepted and would like coverage to begin on a certain date and time. The underwriter 22 then produces a policy 110 and sends it to the agent 21 or business entity 20. The business entity is now considered an insured 20. The underwriter 22 also produces an invoice and sends it to the agent 21 or the insured 20.

The above described process is repeated for numerous business entities 20 and agents 21 ultimately culminating in a book of insurance which is a set of policies for an underwriter 22 becoming effective during a certain time period. The underwriter 22 hopes that the losses reported by its insureds 20 on a particular book do not exceed the underwriter's expectation for loss ratio upon which the policy rates were based. The method of the present invention provides an improved method for improving this loss ratio by surveying underwriting ranking criteria 210.

The underwriter 22 can send to the audit survey provider 23 a copy of the policy data electronically for policies issued during the set time period and captured by the underwriter's 22 system. The electronically transmitted information may contain relevant information about the various insureds in the book of insurance 120, the agents 21, how insurance premiums were derived, and terms of the policies 110. The data is loaded into computer database system 24.

Using the computer database system 24, the audit survey provider 23 can perform a survey by telephoning the insured businesses 20 to learn more about their exposure and verify policy information 110. During the telephone survey interview, the audit service provider 23 contacts the insured 20 by telephone and leaves a message, makes an appointment for a full interview, conducts full or partial interview, or marks a record to indicate the insured refused to participate in the interview. Each insured 20 is asked questions and the answers recorded about the insured's 20 business activities and history which would validate the information sent by the underwriter 22 to the audit survey provider 23 and identify various ranking criteria 210. These findings are inputted into the computer database system 24 and can later be used to numerically rank 220 or flag each insured based on their responses to the questions.

During the interview, information known about the insured 20 is verified. The insured 20 is given information about posting requirements and claim reporting procedures. Information about the insured's 20 business operations and age of business can be obtained and recorded. A discussion of the types of employees and their pay rates can be determined and recorded. Specific occupational exposures are identified through discussions with the insured 20. The audit survey provider 23 is able to give a subjective risk rating and make comments on his impression of the business operation. At conclusion, the computer database system 24 can generate a numerical score 220 of the risk that is consistent with identified ranking criteria 210. During the survey 190 the insureds 20 can also be coached by the audit survey provider 23 on how to comply with basic regulations and loss prevention.

The results of the survey 190 are transmitted back to the underwriter 22 for appropriate action which may include endorsement, additional premium, or policy cancellation. After receiving the results of the survey 190 the underwriter 22 can review the ranked or flagged insureds 20 and determine whether additional premium is warranted, a policy endorsement necessary, or even if the insured 20 was deemed a risk violating underwriting guidelines 200—thus cancellation of the policy would be likely.

The ranking criteria 210 are based on the underwriter's underwriting guidelines 200. For the book of insurance 120 the underwriter 22 may have very specific underwriting guidelines 200 leading to ranking criteria 210 which include, for example, things like:

Don't insure anyone in the snow plowing business;
Don't insure anyone who uses scaffolding hat rises above 25 feet;
Don't insure anyone who is in the roofing business (installation or repair);
Don't insure any business that has not been in existence and with stable ownership for more than three years.

Other examples of ranking criteria 210 can be payroll amounts and employee numbers not matching the underwriter's 22 records for the specific insured entity 20.

In a preferred embodiment of the present invention various ranking criteria 210 can each be given specific criteria point values 215 (for example, a negative 35 points for businesses not in existence for more than three years) approximating the relative importance of each ranking criteria 210 in relation to all other ranking criteria. A numerical score 220 can be calculated based on the criteria point values 215 assigned to each ranking criteria 210 and then identifying which specific ranking criteria 210 are applicable to the insured 20. Numerically ranking each insured 20 or flagging insureds 20 for identified ranking criteria 210 enables a user to uncover insureds 20 with exposures inadequately or not at all defined and thus additional premium warranted.

Insurance policies 110 that should have not been issued, such as when the survey found the risk did not meet applicable underwriting guidelines 200 are readily discovered using the numerically ranked or flagged insureds 20 through "management by exception." Insureds 20 receiving the most problematic numerical ranking scores 220 can be addressed first by the underwriter 22. Insureds 20 receiving numerical ranking scores 220 considered satisfactory to the underwriter 22 or no flags need not be further reviewed.

Built in management reports and the ability to extract information from the computer database system 24 allows the underwriter 22 to efficiently deal with poor scoring insureds 20.

FIGS. 1 through 9, and 11 show a preferred embodiment using a computer database system 24 for prompting, organizing, recording, and analyzing the questions asked and responses recorded during the survey 190. Once the numerical ranking criteria 210 are defined based on the underwriter's underwriting guidelines 200 and relative criteria point values 215 assigned to each ranking criteria 210, one skilled in the art can program a computer database system 24 to prompt the audit survey provider 23 to solicit responses related to the ranking criteria 210, record insureds' 20 responses, calculate the numerical ranking score 220 of each insured 20 surveyed (or flagging particular insureds), and report the survey results 230.

In programming the computer database system 24, any object oriented programming language can be used, for example C, Java, Access, and Visual Basic. Database programs, for example D-Base, can also be used. Furthermore, spreadsheet programs such as Lotus 123 and Excel could also be used. Other programming languages can also be used. In creating the specific database program, prompting messages can be provided, along with spaces for survey 190 input, and algorithms for performing various survey comparisons, for example calculating disparities between payroll listed on an insured's 20 application and that stated in the survey 190, along with calculating each insured's 20 numerical ranking scores 220 could also be included. Various reporting functions can also be included, for example numerically listing the insureds 20 by ascending or descending numerical ranking score 220 (or listing insureds flagged) or coming over or below specified numerical ranking scores 220, along with reporting functions on one or more ranking criteria 210, such as payroll discrepancies.

Figure 1:
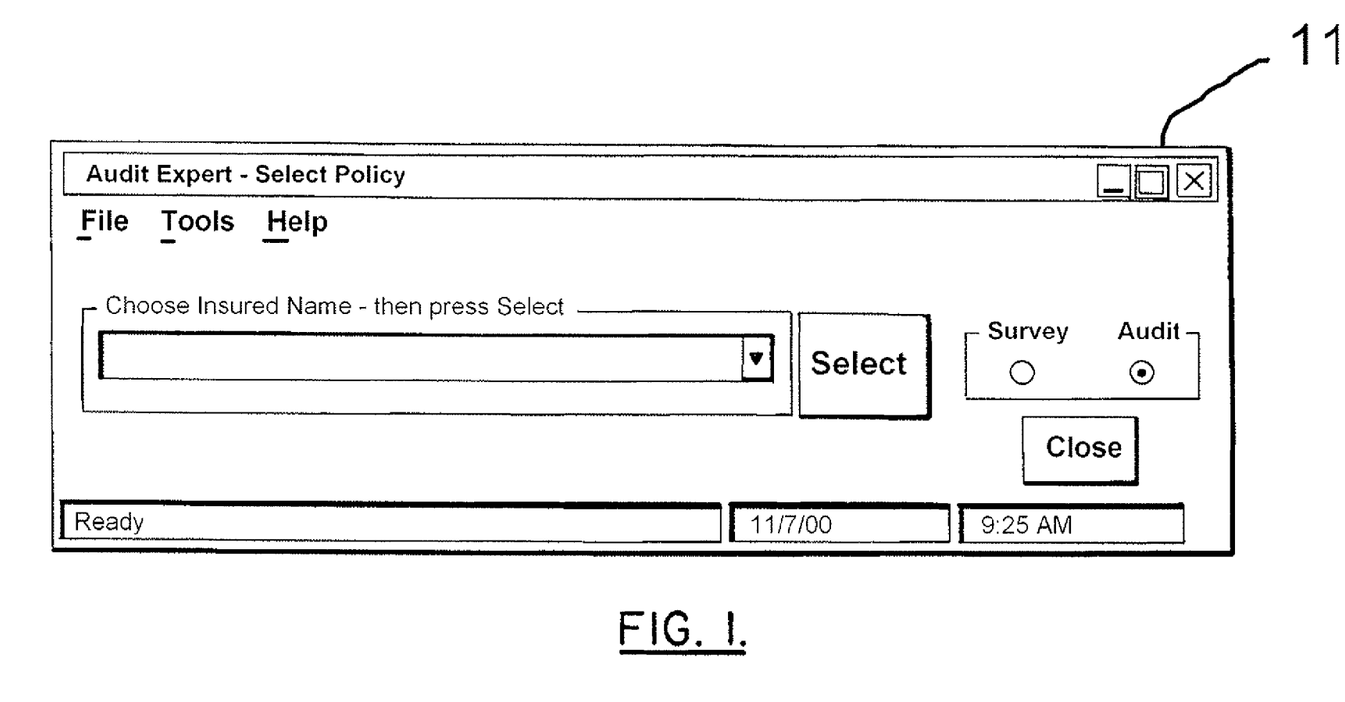
FIG. 1 is a preferred embodiment of the present invention showing an user interface display for selecting an insured for surveying.

FIG. 1 is a preferred embodiment of the present invention showing an user interface display 11 for selecting an insured 20 for the survey 190. Insureds 20 surveyed are selected from the book of insurance supplied by the underwriter 22 to the audit survey provider 23. The audit survey provider 23 simply picks an insured 20 from the computer database system 24.

Figure 2:
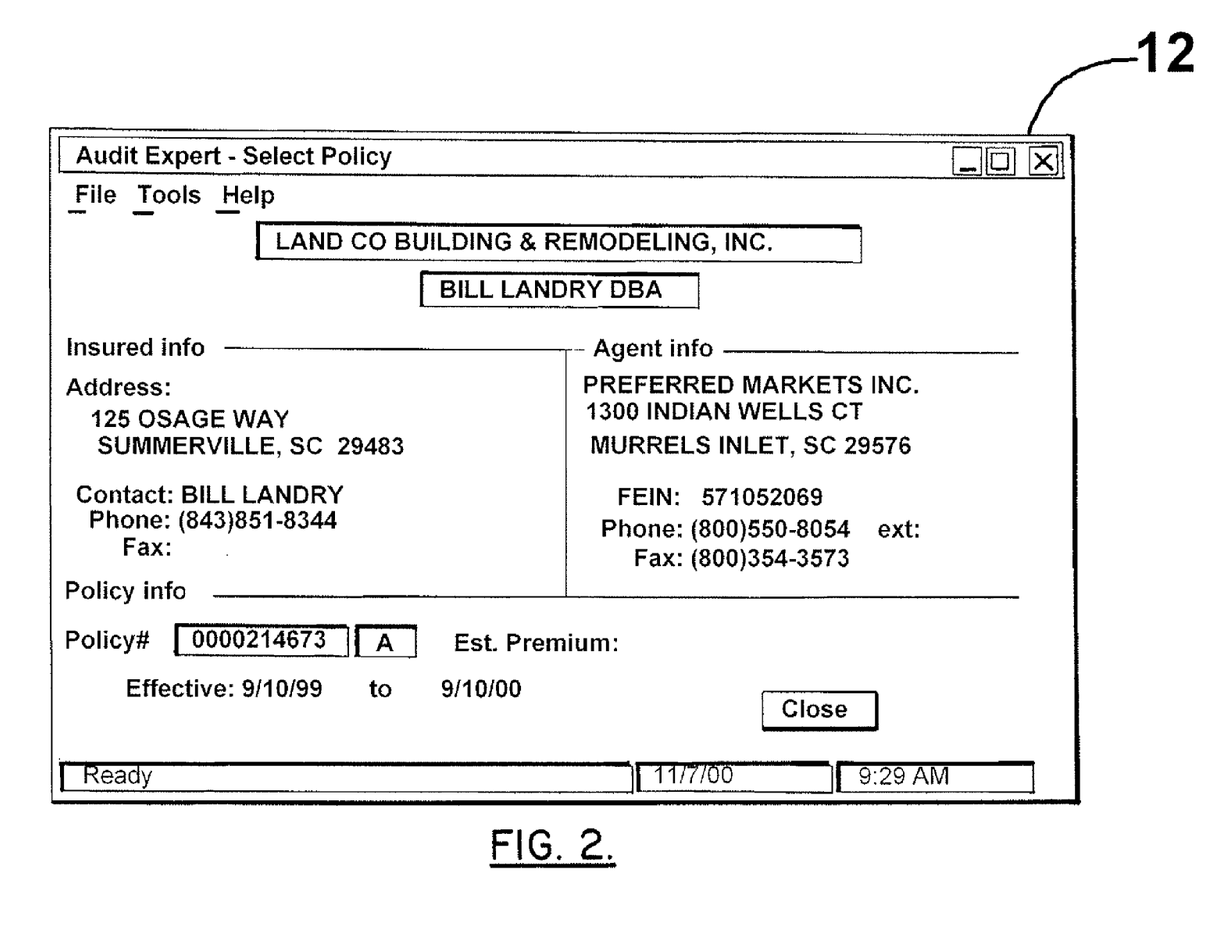
FIG. 2 is a preferred embodiment of the present invention showing an user interface display for selecting a policy for surveying and illustrating representative information for the policy which may be electronically transmitted from the underwriter to the audit survey provider.

FIG. 2 is a preferred embodiment of the present invention showing an user interface display 12 for selecting an insured's 20 policy 110 to be surveyed 190 and illustrating representative information for the policy 110 which may be electronically transmitted from the underwriter 22 to the audit survey provider 23. In FIG. 2 the survey process is initiated with display 12 wherein the audit survey provider 23 inputs or has data displayed in the form of the insured's 20 identity, including name, contact person and telephone, the agent's information, including the agent's 21 name and address and FEIN number, telephone and facsimile number as well as the policy 110 information, including policy number, estimated premium, and effective dates. Other related survey 190 information can be added to the display in FIG. 2.

Figure 3:
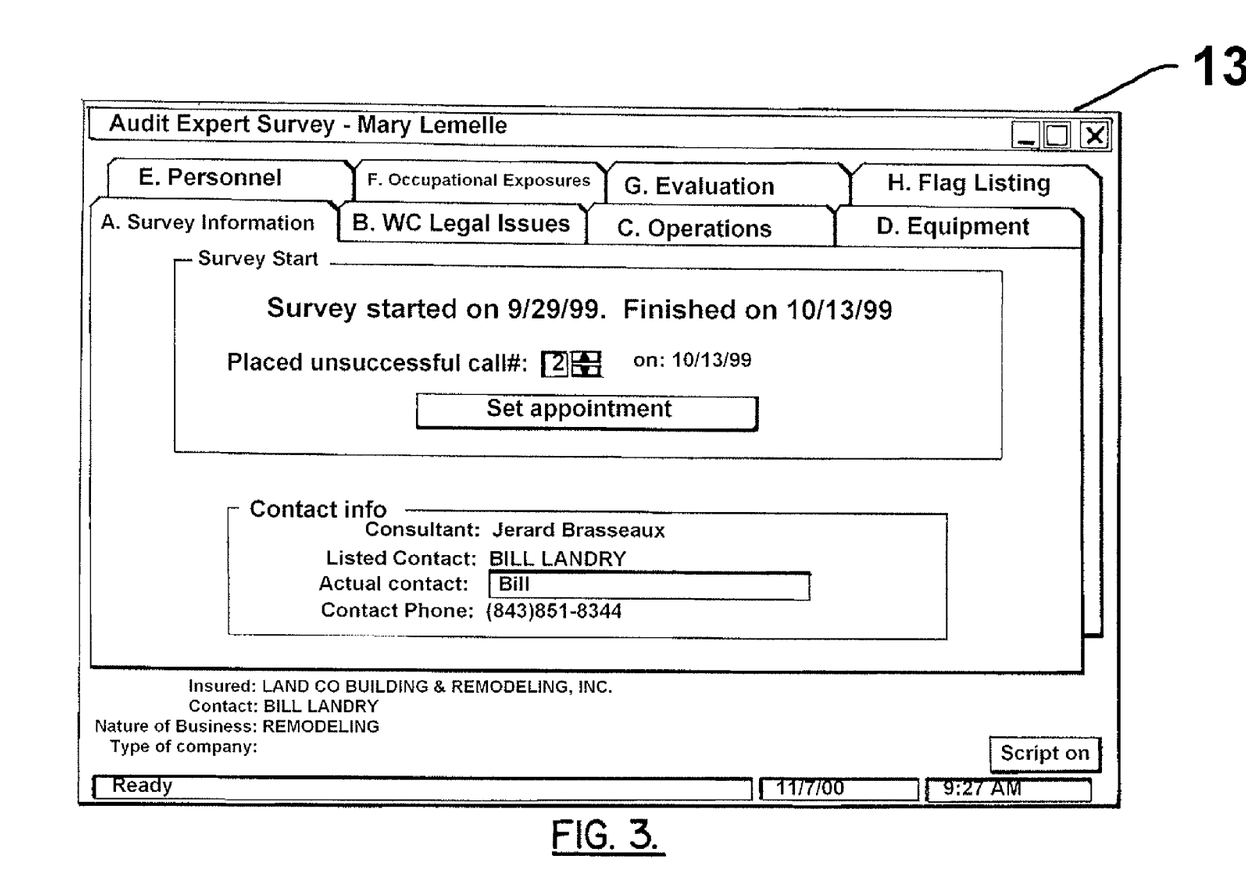
FIG. 3 is a preferred embodiment of the present invention showing an user interface display illustrating information on the survey itself for the particular policy such as who was contacted and the number of unsuccessful survey attempts.

FIG. 3 is a preferred embodiment of the present invention showing an user interface display 13 illustrating information on the survey 190 itself for the particular policy 110 such as who was contacted in the survey 190 and the number of unsuccessful attempts at performing the survey 190. This figure includes input for the start date of the survey 190, the number of unsuccessful survey 190 attempts, and the completion date.

This information is useful in setting limits on the number of attempts and period of time before the insured 20 will be listed as an unsuccessful survey participant. This figure also provides an overall screen to indicate when the survey 190 has started, contact information, and includes folders A-H that including: (a) survey information; (b) WC legal issues; (c) operations; (d) equipment; (e) personnel; (f) occupational exposures; (g) evaluation; and (h) penalty detail.

Figure 4:
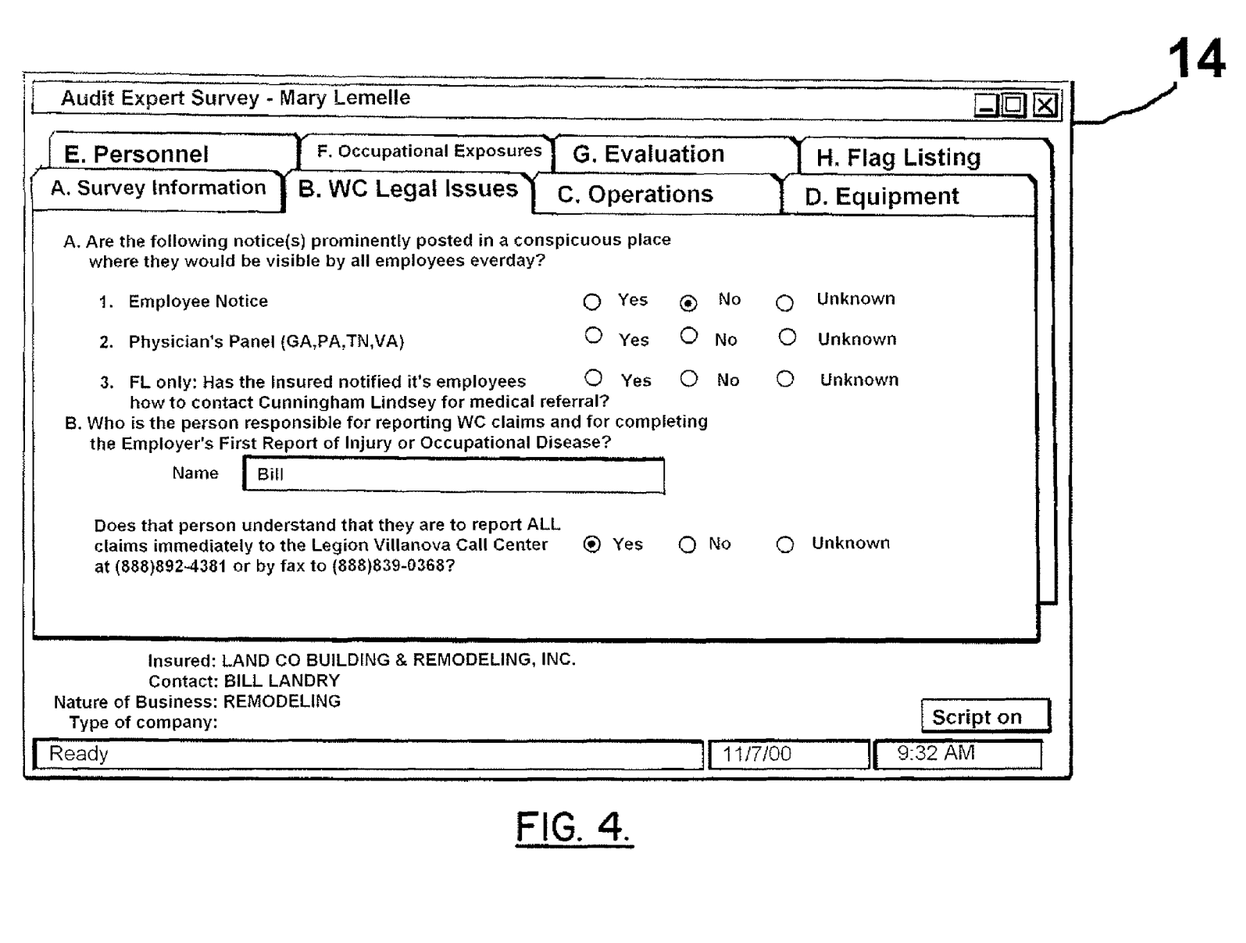
FIG. 4 is a preferred embodiment of the present invention showing an user interface display illustrating example points on which the insured being surveyed can be educated such as legal and loss reporting issues.

FIG. 4 is a preferred embodiment of the present invention showing an user interface display 14 illustrating example points on which the insured 20 being surveyed can be educated such as on legal and loss reporting issues. Educating the insured 20 on legal requirements and loss reporting can also reduce the loss ratio for the underwriter 22 by improving compliance on such issues. In FIG. 14 the insured 20 is asked questions about placement of worker's compensation notices and requirements and the name of the individual responsible for reporting claims and duties in reporting.

Figure 5:
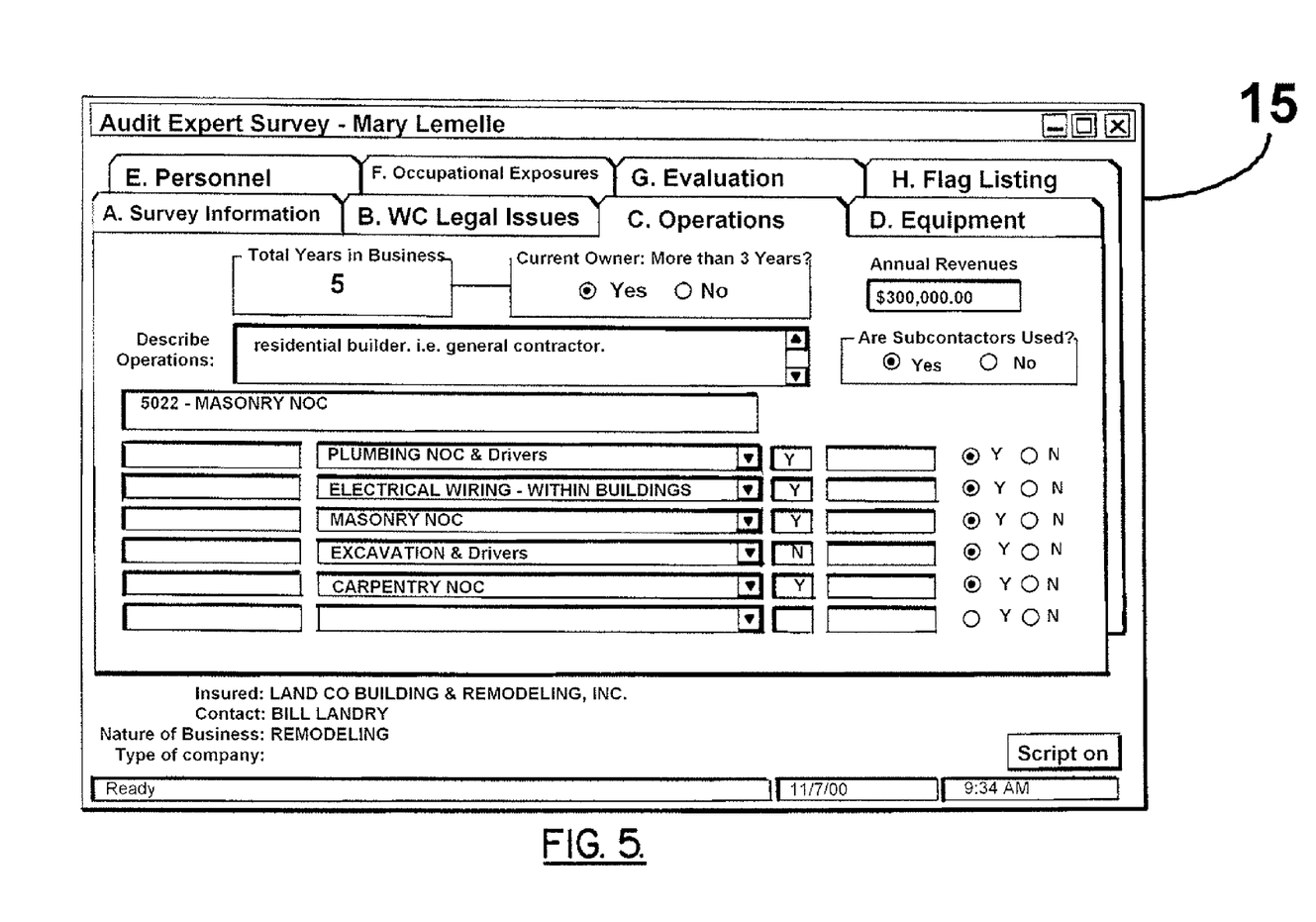
FIG. 5 is a preferred embodiment of the present invention showing an user interface display illustrating example inputs regarding business operations for numeral ranking criteria.

FIG. 5 is a preferred embodiment of the present invention showing an user interface display 15 illustrating example inputs regarding operations; the total years in business; estimates for the total annual revenues; whether the insured 20 uses subcontractors; if so used, inputting specific listings of subcontractor's work descriptions; estimates of annual dollar amounts; and whether the insured 20 obtains certificates of insurance from each such subcontractor. If no certificate of insurance is obtained from a particular subcontractor, that subcontractor can be automatically included in the calculation for the overall annual payroll for the insured 20 in calculating payroll discrepancies. Also inputted is whether the work description for the subcontractor is an area approved by the underwriter 22 in its underwriting guidelines 200. If a non-approved work description is found a criteria point value 215 for such finding can also be applied to the insured's 20 numerical ranking score 220.

Figure 6:
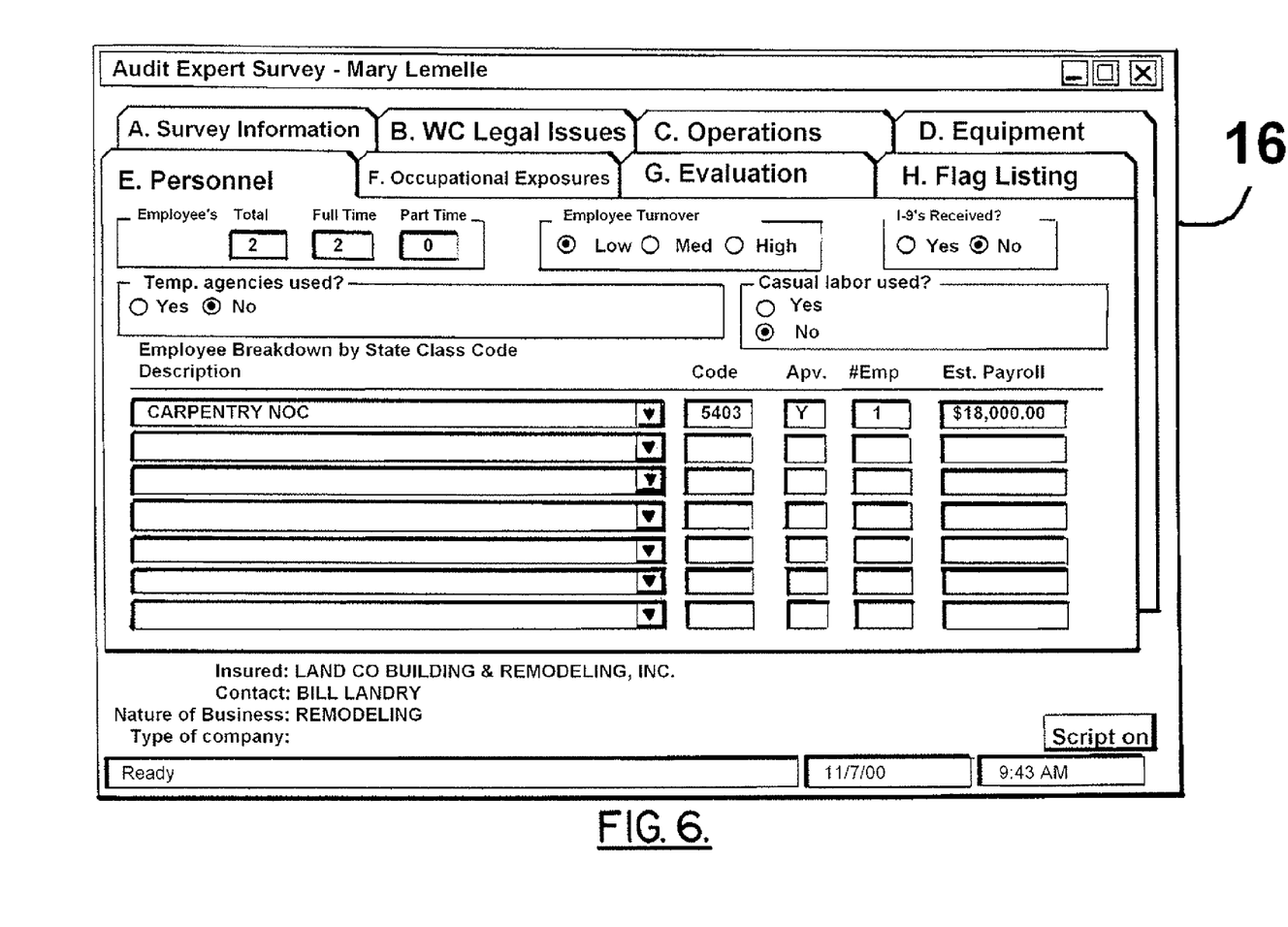
FIG. 6 is a preferred embodiment of the present invention showing an user interface display illustrating example inputs regarding personnel for numeral ranking criteria.

FIG. 6 is a preferred embodiment of the present invention showing an user interface display 16 illustrating example inputs regarding personnel. Inputted are the number of full time and part time employees, employee turnover rating; whether casual labor is used; and, if so, estimating the numbers of days per year casual labor is used; estimating the frequency labor is obtained from temporary agencies; and whether proofs of insurance are obtained by insured 20 for this temporary labor. A job description for each employee is obtained and the audit survey provider 23 classifies such employees under state insurance classification codes such as those promulgated by the National Council on Workers Compensation Insurance and adopted by states. An estimate of the payroll for each employee is inputted. Also inputted is whether the classification is one approved by the underwriter 22 in its underwriting guidelines 200. If a non-approved work description is identified, a criteria point value 215 for same can also be applied to the insured's 20 numerical ranking score 220.

Figure 7:
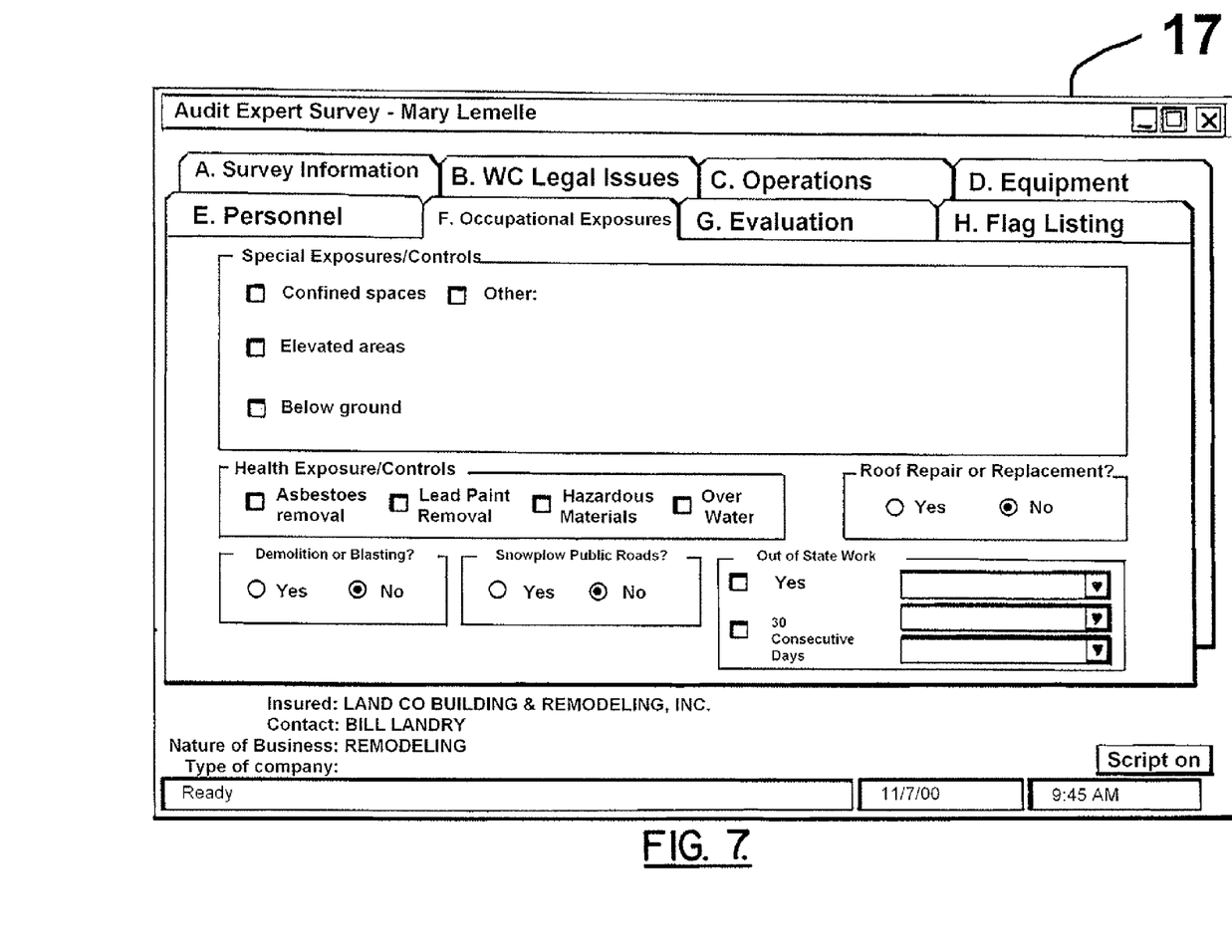
FIG. 7 is a preferred embodiment of the present invention showing an user interface display illustrating example inputs regarding occupational exposures for numeral ranking criteria.

FIG. 7 is a preferred embodiment of the present invention showing an user interface display 17 illustrating example inputs regarding occupational exposures. Inputted are special exposures such as work in confined spaces; work in elevated areas at a specified maximum height; work below ground at a specified maximum depth; whether work is performed above water; whether work is performed in the areas of asbestos removal; work in lead paint removal; and work in handling of hazardous waste. Also inputted is whether work is performed in the areas of roof repair or replacement; demolition or blasting; using lifting devices; or snowplowing on public roads. Also inputted is whether the insured 20 performs non-home state work, a listing of the states worked in, and an estimate of whether this work exceeds a specified number of consecutive days on an annual basis.

Figure 8:
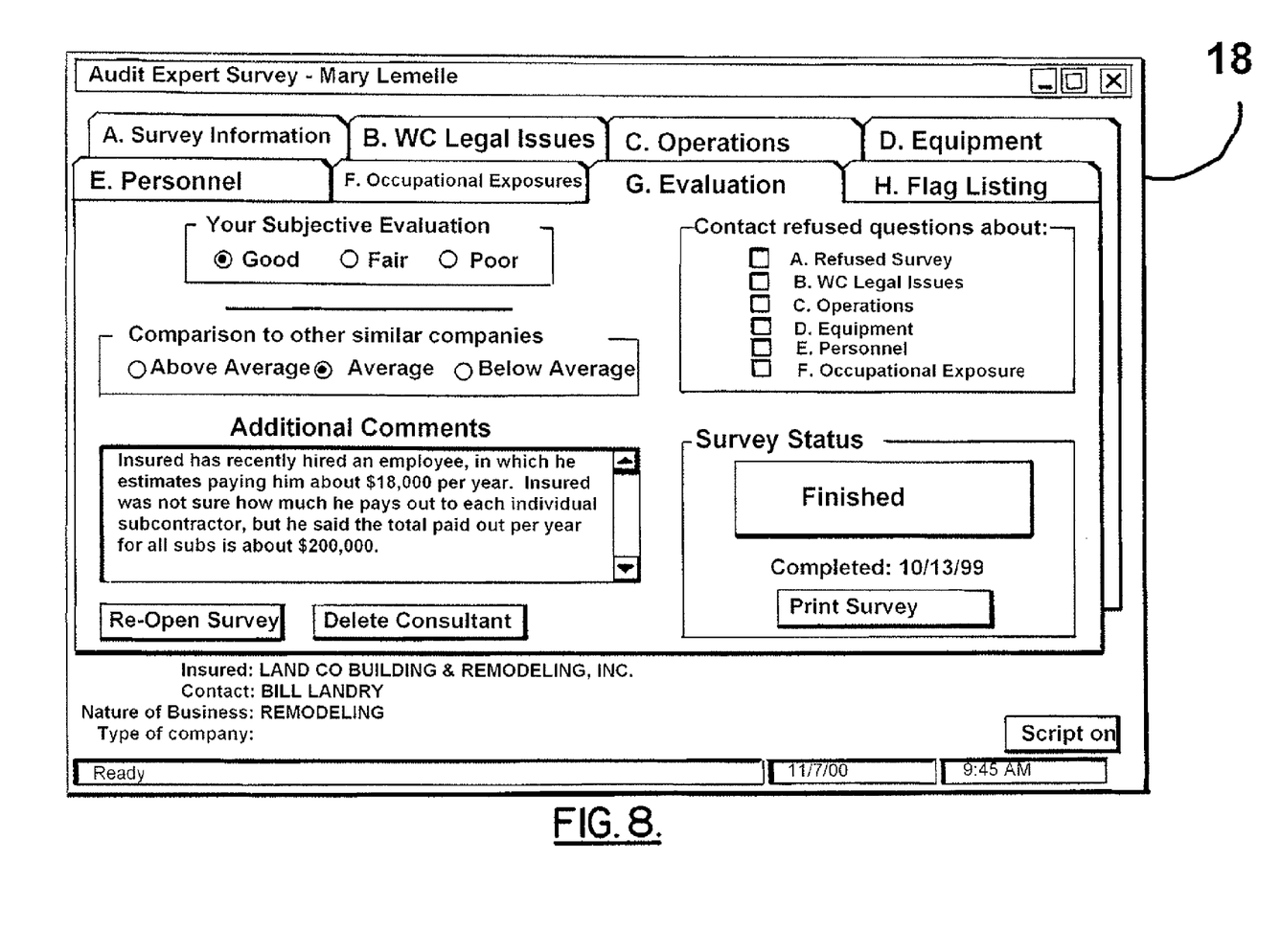
FIG. 8 is a preferred embodiment of the present invention showing an user interface display illustrating a summary of the survey and including inputs for the audit survey provider's subjective opinion and relative ranking, and individual comments.

FIG. 8 is a preferred embodiment of the present invention showing an user interface display 18 illustrating a summary of the survey 190 and including inputs for the audit survey provider's 23 subjective opinion and relative position of the insured 20, and individual comments. The audit survey provider 23 inputs his subjective evaluation, either good, fair or poor along with a relative comparison to other companies similarly situated, either above average, average, or below average. The audit survey provider 23 can also input specific comments about the insured 20. Also inputted is whether the insured 20 refused to answer questions in the areas of: (a) the whole survey; (b) legal issues; (c) operations; (d) equipment; (e) personnel; and (f) occupational issues. The status of the survey 190 appears in this figure.

Figure 9:
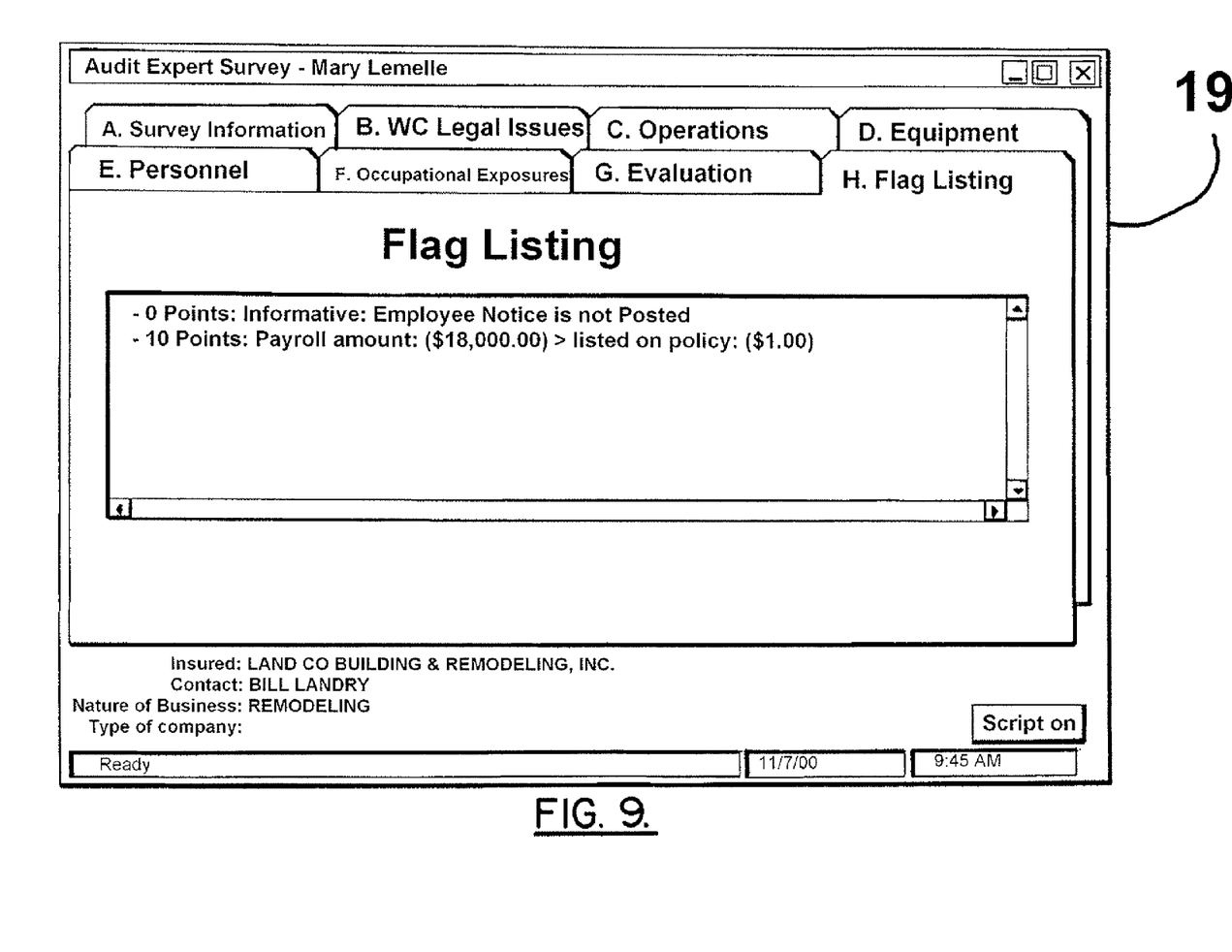
FIG. 9 is a preferred embodiment of the present invention showing an user interface display illustrating an example listing of specific ranking criteria identified in the telephone survey of the insured and the specific point values assigned to such criteria.

FIG. 9 is a preferred embodiment of the present invention showing an user interface display 19 illustrating an example listing of the criteria flagged in the survey 190 and the specific criteria point values 215 assigned to such criteria. Identified or flagged ranking criteria 210 are listed for the insured 20 surveyed along with the specific criteria point values 215 assigned to each flagged ranking criteria 210.

Figure 11:
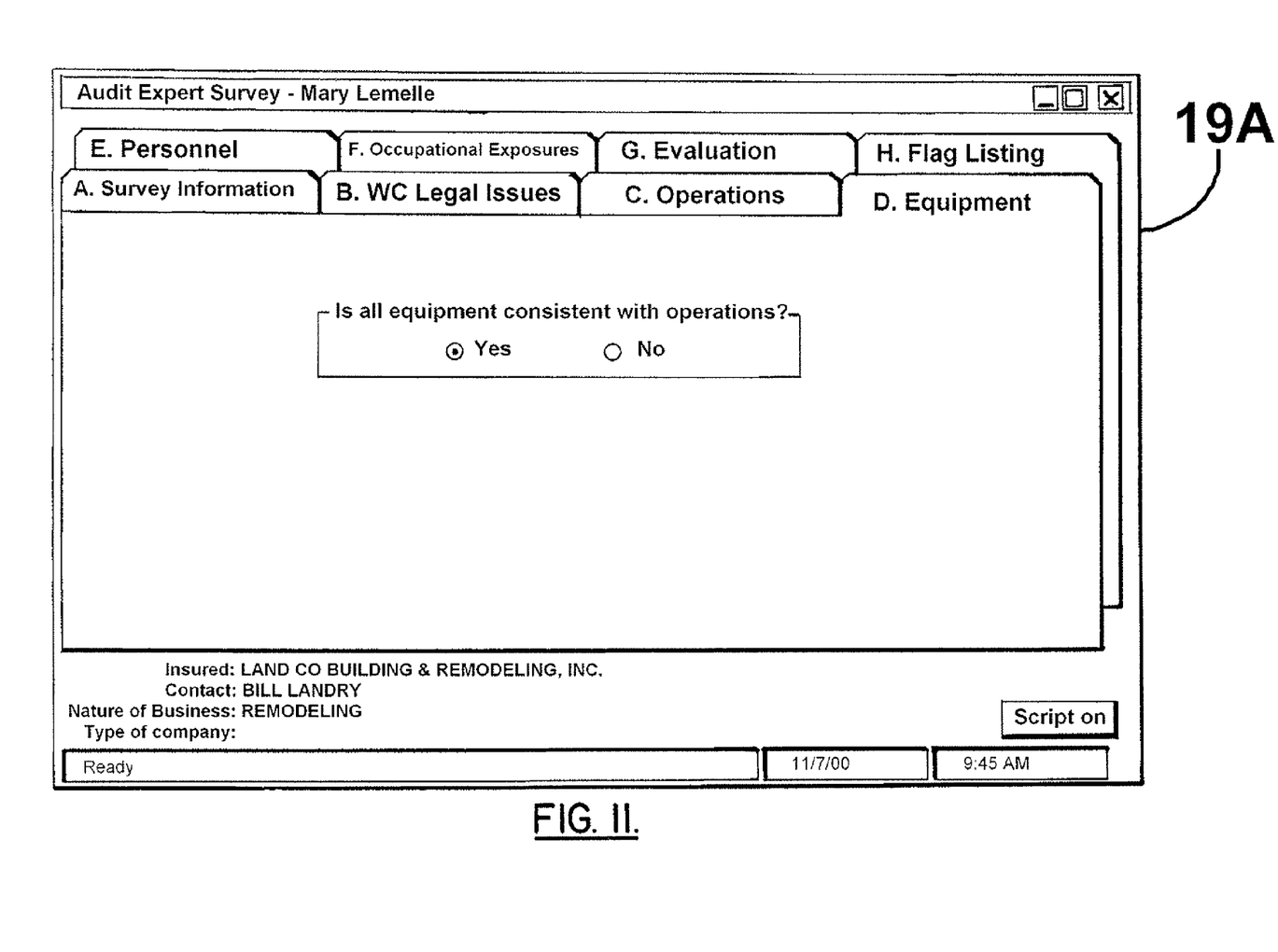
FIG. 11 is a preferred embodiment of the present invention showing an user interface display illustrating inquiries related to whether equipment used by insured is consistent with operations upon which premium was calculated.

FIG. 11 is a preferred embodiment of the present invention showing an user interface display 19A illustrating inquiries related to whether equipment found in the survey is consistent with the classification codes applied to the insured 20 for determining premium. If inconsistent equipment is found the audit survey provider 23 can input specific comments into the "additional comments" box shown in FIG. 8 which can be reported to the underwriter 22.

In another embodiment, trends regarding insurance agents 21 failing to accurately complete insurance applications can be investigated. For example, the survey 190 could identify, for each insured 20, the applicability of specific ranking criteria 210 (such as inaccurate payroll estimates, numbers of employees, and/or insureds being in business for less than three years). Insureds 20 having identified ranking criteria 210 would have ranking scores 220 impacted by criteria point values 215 assigned to the identified criteria 210. The calculated scores 220 could then be reported on an insurance agent-by-insurance agent 21 basis. Insurance agents 21 found to have insureds 20 with consistently problematic numerical ranking scores 220 or flags could be further investigated to determine if the agents 21 were inaccurately submitting information. If so found, future applications from problem insurance agents 21 could be rejected.

Another embodiment of the present invention includes auditing the insured 20 after a policy 110 has expired to determine that the exposure used for premium calculation was properly applied to the insured 20. The insured 20 can be audited to determine if additional premium or refund is due based on an under/over-estimation of payroll or sales on the application. The audit survey provider 23 can, on behalf of the underwriter 22, mail out a questionnaire requesting information and supporting documentation upon which premium was determined, such as actual payroll or gross sales. After receiving the completed questionnaire and supporting documentation, the audit survey provider (now auditor) 23 conducts an audit also using the information obtained from the earlier survey 190. The audit may require telephoning the insured 20 to clarify facts or determine why inconsistencies exist between the completed questionnaire, submitted documentation, and the information recorded in the survey 190. The results of the audit can be electronically transmitted to the underwriter 22 to assist it in calculating additional premium or a return premium.

FIG. 10 shows an overall flow diagram illustrating the interaction the insured, insurance agent, underwriter, and audit survey provider. Arrow 300 represents interaction between business entity 20 and insurance agent 21 are represented. Business entity 20 can be seeking insurance coverage (s) and insurance advice through and from agent 20. Arrow 310 represents the application being submitted for an insurance quote to an underwriter, insurance company, underwriting organization, or managing general agency 22. In the application for insurance quote key information is provided about the business entity 20 and the practices of the exposure for the business entity. If the business entity 20 fits the underwriter's 22 acceptable underwriting guidelines 200, information is used to develop a quote which includes rates and an estimated premium. Arrow 320 represents the transmittal of this quote to the insurance agent 21. Arrow 330 represents the transmittal of this quote from the insurance agent 21 to the business entity 20. Arrow 340 represents notification by the business entity 20 to the agent 21 that the quote is accepted. Arrow 350 represents agent 21 notifying insurer or underwriter 22 to bind insurance coverage. Arrow 360 represents insurer or underwriter 22 sending policy 110 and premium invoice to the agent 21 or insured business entity 20. Arrow 370 represents the underwriter 22 sending to the audit survey provider 23 a copy of the policy data electronically. Arrow 380 represents the audit survey provider 23 loading the policy data information into a computer database system 24. Arrow 390 represents the audit survey provider 23 using the computer database system 24, to perform a survey by telephoning the insured business 20 to learn more about exposure, verify information, providing loss control recommendations and answers and recording findings in the computer database system 24. Arrow 400 represents the audit survey provider electronically submitting the results to the insurer or underwriter 22 and such information being inputted into the underwriter's 22 computer database system 24A. Arrow 410 represents the audit survey provider 23 being contracted to contact the insured business 20 after policy insurance policy 110 termination to conduct a premium audit 195 to determine if the actual premium (derived by business payroll and/or sales) is different from estimated premium.

The following is a list of reference numerals used in the specification:

PARTS LIST FOR REFERENCE NUMERALS

| (Part No.) | (Description) |
|---|---|
| 10 | improved method of improving loss ratio on a book of insurance |
| 11 | input display |
| 12 | input display |
| 13 | input display |
| 14 | input display |
| 15 | input display |
| 16 | input display |
| 17 | input display |
| 18 | input display |
| 19 | input display |
| 19A | input display |
| 20 | insured or business entity |
| 21 | insurance agent |
| 22 | underwriter or insurance company |
| 23 | audit survey provider |
| 24 | audit expert database |
| 100 | application for insurance coverage |
| 110 | insurance policy |
| 120 | book of insurance |
| 190 | survey |
| 195 | premium audit |
| 200 | underwriting guidelines |
| 210 | ranking criteria |
| 215 | criteria point value |
| 220 | numerical ranking score |
| 230 | reporting survey results |

The foregoing embodiments are presented by way of example only. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims.

The invention claimed is:

1. A method of improving the loss ratio on an existing book of insurance, the book comprising existing insurance policies for a set of insured entities, the method comprising the steps of:
   a) obtaining a set of policy information for the insured entities upon which binding of each policy was based;
   b) providing a set of predetermined underwriting criteria;
   c) using a computer having a user interface display for inputting data from responses to a set of survey questions, the display including a plurality of spaces for survey data input;
   d) surveying at least a first portion of the set of insured entities, the survey eliciting responses to the set of survey questions in step "c";
   e) on an individual basis, for at least a second portion of the set of entities surveyed, inputting data from the responses received in step "d" into the computer at the spaces provided for in the display in step "c";

f) a computer comparing the data inputted during step "e" on an individual basis with at least a third portion of the policy information obtained in step "a", flagging any disparity in the attempt to validate, and for at least a fourth portion of the set of entities surveyed, having the computer flag each insured entity that does not meet a set predetermined underwriting criteria;

g) reporting to the underwriter survey information on at least a fifth portion of the insureds who were flagged in step "f";

h) reviewing the report of step "g" and thereafter taking steps to improve the loss ratio of the book of insurance; and i) wherein the book of insurance includes multiple policies selected from the group consisting of: worker's compensation, general liability, products liability, property, professional liability, and automobile.

2. The method of claim 1, wherein in step "g" the insurance underwriter improves the book of insurance by terminating some of the insurance policies of the book of insurance policies.

3. The method of claim 1, wherein in step "g" the insurance underwriter improves the book of insurance by amending the terms of one or more of the insurance policies of the book of insurance policies.

4. The method of claim 1, wherein in step "g" the insurance underwriter improves the book of insurance by not renewing some of the insurance policies of the book of insurance policies.

5. A method of enabling an underwriter to improve the loss ratio on an existing book of insurance, the book comprising existing insurance policies for a set of insured entities, the method comprising the steps of:

a) obtaining a set of policy information for the insured entities upon which binding of each policy was based;

b) providing a set of predetermined underwriting criteria;

c) using a computer having a user interface display for inputting data from responses to a set of survey questions, the display including a plurality of spaces for survey data input;

d) surveying at least some of the insured entities, the survey eliciting responses to the set of survey questions in step "c";

e) on an individual basis, for at least some of the insured entities surveyed, inputting data from the responses received in step "d" into the computer at the spaces provided for in the display;

f) using a computer to compare the data inputted during step "e" on an individual basis with at least some of the policy information obtained in step "a";

g) using the computer to identify exceptions to expected answers in the attempt to validate, and for some of the entities surveyed, having the computer flag each insured entity that does not meet the set of predetermined underwriting criteria;

h) reporting to the underwriter survey information on at least some of the insured entities who were flagged;

i) the insurance underwriter reviewing the report of step "g" enabling the insurance underwriter to take one or more steps to improve the loss ratio of the book of insurance after receiving the survey that is reported; and j) wherein the book of insurance includes multiple policies selected from the group consisting of: worker's compensation, general liability, products liability, property, professional liability, and automobile.

6. The method of claim 5, wherein in step "h" the insurance underwriter improves the book of insurance by terminating some of the insurance policies of the book of insurance policies.

7. The method of claim 5, wherein in step "h" the insurance underwriter improves the book of insurance by amending the terms of one or more of the insurance polices of the book of insurance policies.

8. The method of claim 5, wherein in step "h" the insurance underwriter improves the book of insurance by not renewing some of the insurance policies of the book of insurance policies.

* * * * *